UNITED STATES PATENT OFFICE.

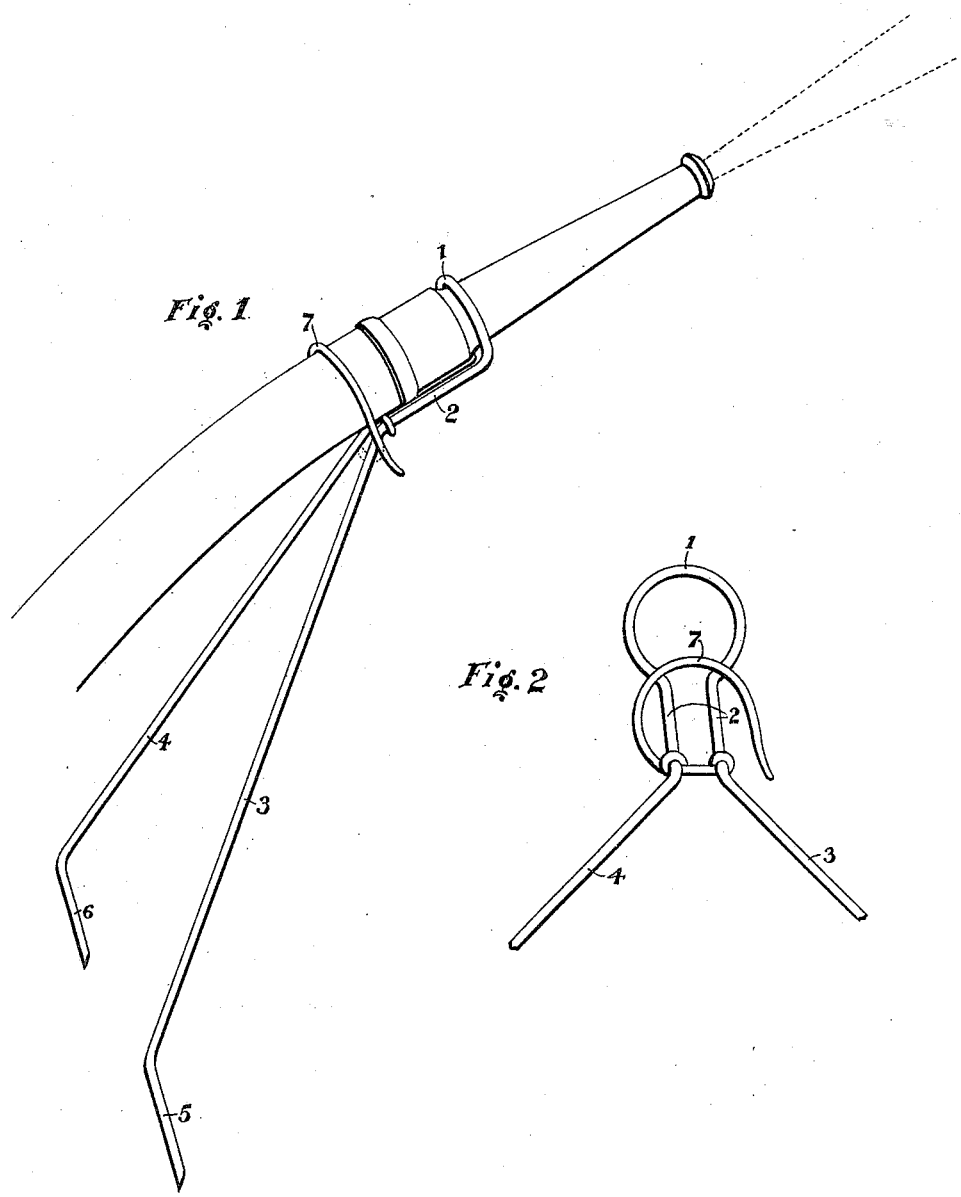

HERBERT AUSTIN, OF SAN ANTONIO, TEXAS.

HOSE-NOZZLE HOLDER.

1,078,817.

Specification of Letters Patent.

Patented Nov. 18, 1913.

Application filed March 15, 1913. Serial No. 754,523.

*To all whom it may concern:*

Be it known that I, HERBERT AUSTIN, a citizen of the United States, residing at San Antonio, in the county of Bexar and State of Texas, (whose post-office address is 227 West Evergreen street,) have invented a new and useful Improvement in Hose-Nozzle Holders, Called a Hose-Spider, of which the following is a specification.

My invention relates to an attachment for hose nozzles being a holder therefor and particularly a holder for garden hose nozzles.

It contemplates the provision of an upright ring situated at the front end of, and at a perpendicular right angle to, a level platform, or body portion, at the rear of which platform, or body portion, and opposite the said ring, is provided a clip and branching off from this body portion, branching off divergent angularly backward and downward in rear of the clip and backward and downward from the body portion and rigidly fixed thereto are two legs angularly divergent from each other and with the ends of the legs bent angularly divergent toward the front of the device, thus making two feet.

By placing a nozzle point in the front ring and clamping the hose in the clip, at and behind the nozzle, the loose end of the clip being fastened around one leg, or otherwise fastened securely with the clip, this device thus provides a substantial holder and support for the nozzle in use and which support is firmly fastened to the hose and nozzle, with the legs of the device running backward and downward in rear of the nozzle and along the line of the hose.

This device may also be placed upon the nozzle and become a part thereof, by placing the point of the nozzle in the front ring and fastening the clip around the sunken place found at the rear end of nearly all adjustable hose nozzles in general use for garden hose, the loose end of the clip being wrapped around one leg or otherwise fastened so that the nozzle may not come out of the clip, while at the same time the nozzle may turn freely in the clip. When thus placed upon a garden hose nozzle, the device thus becomes a part thereof (removable at will) and provides a substantial holder and support for the nozzle when on the hose as well as provides, when nozzle is off the hose, a means by which the nozzle may be hung up on any suitable place. In this latter method of attachment the device may never be removed from the nozzle and when once placed thereon may become a part thereof as it does not interfere with hand use of the nozzle and does not interfere with putting the nozzle on the hose, or with taking it off the hose.

When nozzle be on the hose with this device thereto affixed, the hose may be dragged over a lawn or other surface, without damage to the surface, the operation of pulling on the hose causing the nozzle to rise toward the perpendicular and thus placing the feet flat upon the surface and pointing in the direction of the front of the nozzle. Should the device fall over in the operation of dragging the hose the feet will stand upward and thus not catch in the surface. It also shows an advantage that should it fall over on its back while being dragged by the hose, the legs will come loose from any tree or similar obstacle, due to the pliability of the hose and the angular construction of the device.

It shows a further advantage in that it provides a means by which the nozzle when on the hose, may be hung on a nail, hook, or over a fence or similar suitable place, thus providing a means by which the hose may be drained, thus making for longer life and preservation of the hose.

It shows a further advantage in that with this device affixed on a garden hose nozzle, in either method of attachment, one may have any stream as made by the ordinary adjustable garden hose nozzle, at any place and at any angle of direction and the nozzle point may be turned to make any stream as made by the nozzle and while the hose is in operation with water and without lifting the device from the surface and also the height of the stream may be directed by manipulating the hose, by pushing or pulling.

My invention further resides in the following features of construction and arrangement as will be hereinafter described with reference to the accompanying drawings, forming part of this specification, in which:

Figure 1 is a perspective view of my improved nozzle holder, showing the clip fastened around the hose, to be constructed, in this particular construction as shown, of wire of a substantial character. Fig. 2 is the top view showing the construction of the body portion, ring and clip and divergent legs.

In the particular embodiment of my invention and with particular reference to Fig. 1, I provide a nozzle holder constructed, in this particular material of construction, first; of a single piece of wire from which is first formed the front ring 1; the two ends bent backward from the ring to make the body portion 2, and the ring bent upward to the perpendicular from and at right angles to the body portion, then a short distance in rear of this front ring, these two ends are bent angularly divergent in an outward direction from each other angularly downward from the body portion 2, and angularly divergent from each other, thus making the two legs 3 and 4, and the ends of the legs 3 and 4 being bent angularly divergent toward the front of the device, thus making two feet 5 and 6.

At the rear of the body portion 2, and at and in front of the point of the divergence of the two legs 3 and 4, is placed a clip 7, by which the hose at the rear of the nozzle, or the nozzle at the sunken place at the rear thereof, may be securely fastened therein.

Having described my invention, I claim:

A hose nozzle holder of the character described comprising a body portion with an upright ring at the front end thereof, said ring standing at right angles to the body portion, this body portion adapted at all times to occupy the same position of the nozzle in all its changes of direction, said body portion being provided with an upright ring at the front end for the reception of the nozzle point, a clip at the rear of the body portion for the reception of the hose, or nozzle, and to secure the same therein and two legs angularly divergent backward along the line of the hose, angularly divergent downward and angularly divergent from each other and from the rear end of the body portion and rigidly fixed thereto, with feet on the ends of said legs, said feet pointing toward and angularly divergent toward the front of the device.

Signed at San Antonio, in the county of Bexar and State of Texas, this 11th day of March 1913.

HERBERT AUSTIN.

Witnesses:
D. A. BREWER,
J. R. SPRADLIN.

---

Copies of this patent may be obtained for five cents each, by addressing the "Commissioner of Patents, Washington, D. C."

It is hereby certified that the name of the patentee in Letters Patent No. 1,078,817, granted November 18, 1913, for an improvement in "Hose-Nozzle Holders," was erroneously written and printed "Herbert Austin," whereas said name should have been written and printed *Hebert Austin;* and that the said Letters Patent should be read with this correction therein that the same may conform to the record of the case in the Patent Office.

Signed and sealed this 23rd day of December, A. D., 1913.

[SEAL.]
J. T. NEWTON,

*Acting Commissioner of Patents.*